F. N. TAFF.
CULTIVATOR.
APPLICATION FILED MAY 31, 1911.

1,034,165.

Patented July 30, 1912.

4 SHEETS—SHEET 1.

Witnesses:

Inventor:
Frederick N. Taff
By Harold Terrell
his Attorney.

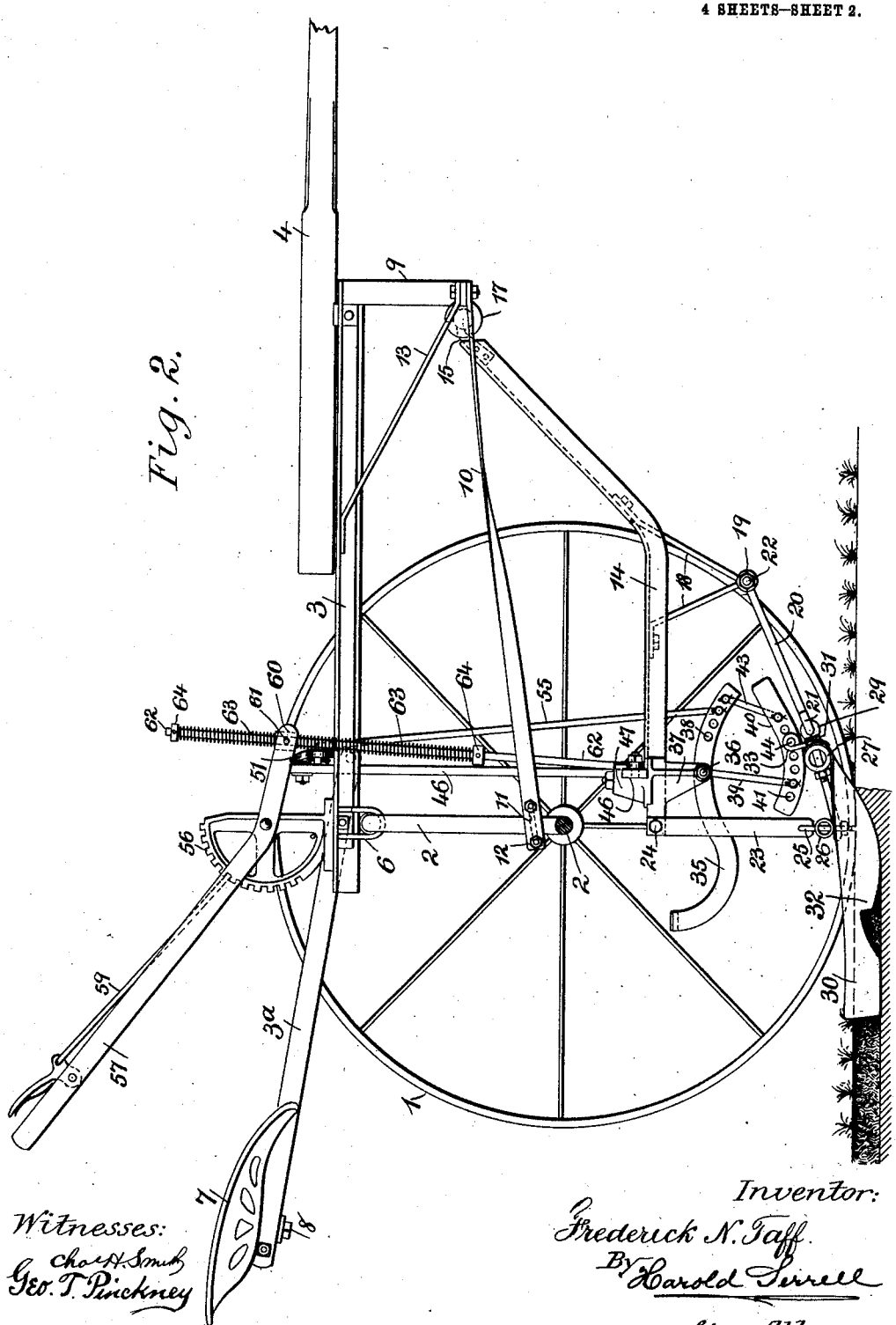

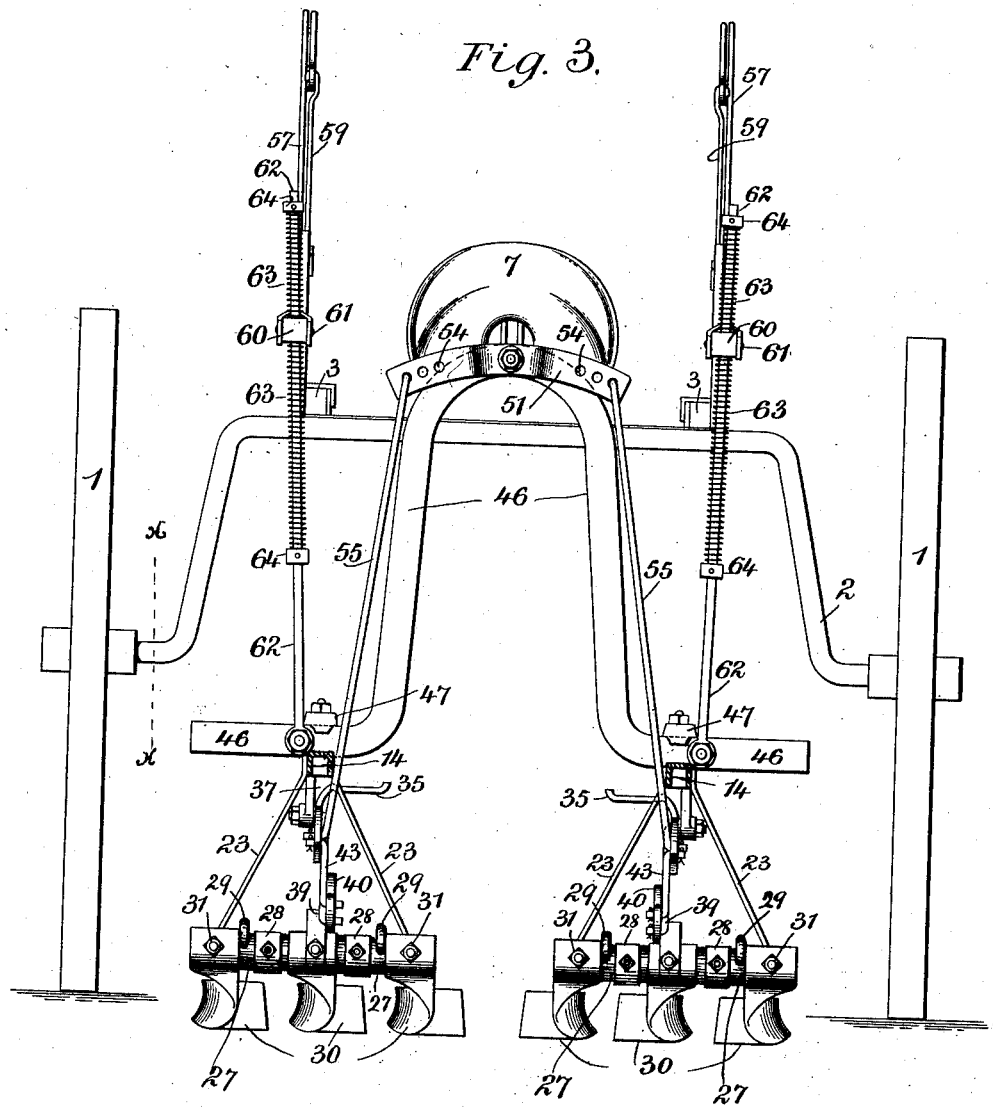

F. N. TAFF.
CULTIVATOR.
APPLICATION FILED MAY 31, 1911.
1,034,165.
Patented July 30, 1912.
4 SHEETS—SHEET 4.
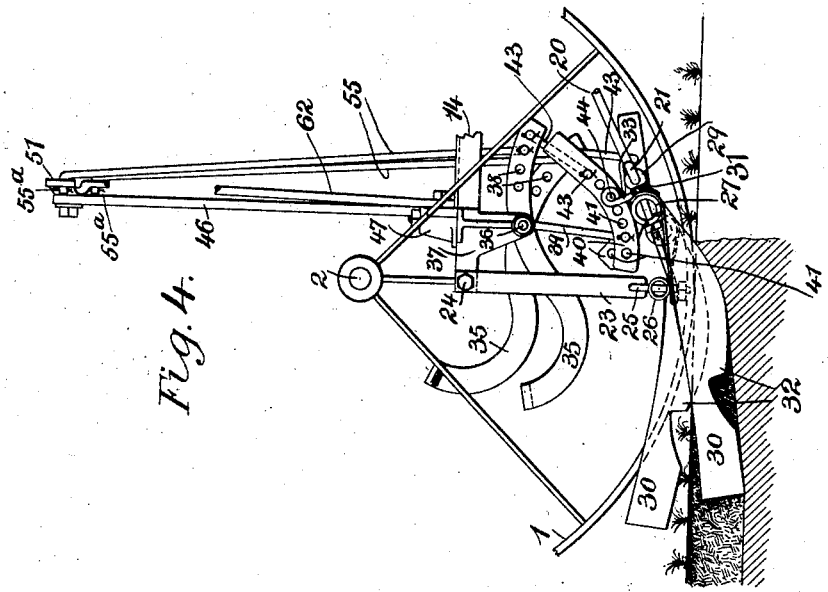
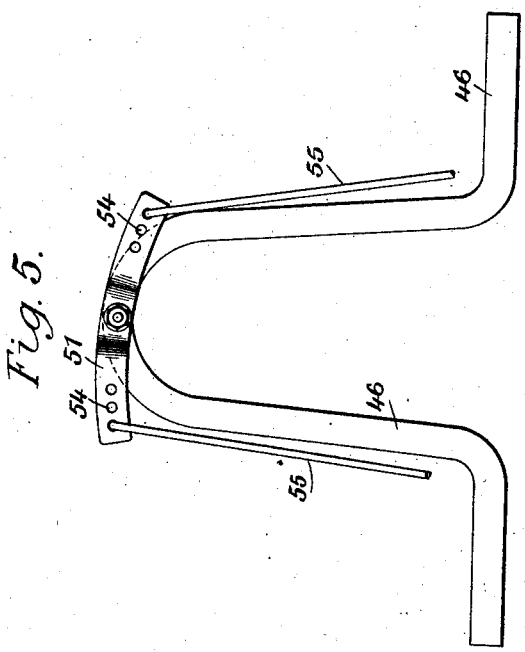
Witnesses:
Chas H Smith
Geo. T. Pinckney
Inventor:
Frederick N. Taff
By Harold Serrell
his Attorney.

UNITED STATES PATENT OFFICE.

FREDERICK N. TAFF, OF MILLINGTON, NEW JERSEY.

CULTIVATOR.

1,034,165.  Specification of Letters Patent.  Patented July 30, 1912.

Application filed May 31, 1911. Serial No. 630,370.

*To all whom it may concern:*

Be it known that I, FREDERICK N. TAFF, a citizen of the United States, residing at Millington, in the county of Morris and State of New Jersey, have invented an Improvement in Cultivators, of which the following is a specification.

My invention relates to a machine for cultivating growing crops which machine operates to pulverize and mellow the surface soil to a depth sufficient for the requirements of cultivation and the eradication of weeds, yet not of a depth sufficient to disturb the roots of the crop being cultivated, and in carrying out my invention, I employ sinuous colters in combination with novel mechanism for operating them in a horizontal plane and adjusting them to varying inclined positions in vertical planes, which mechanism is hereinafter more fully described.

Figure 1:
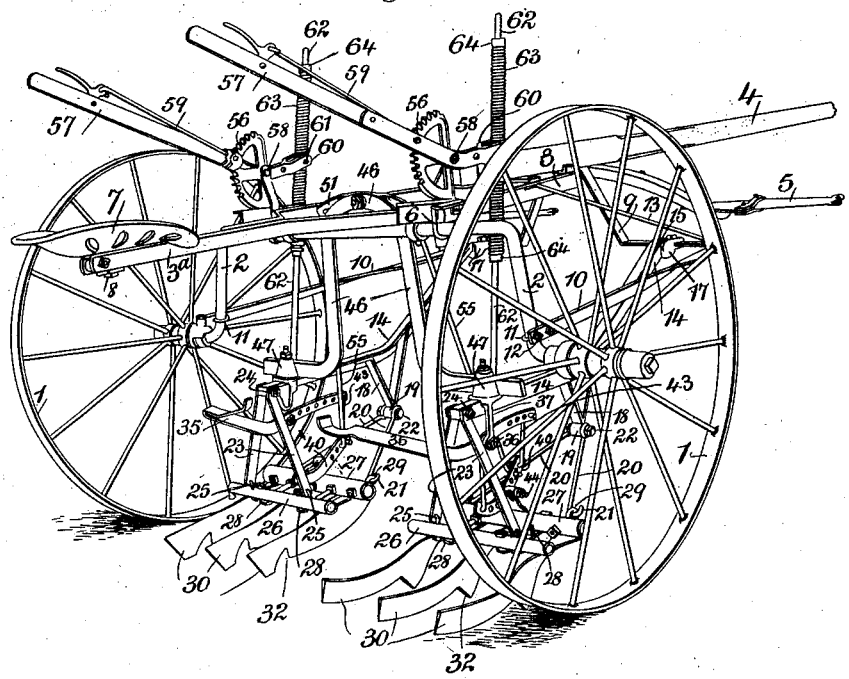
Figure 6:
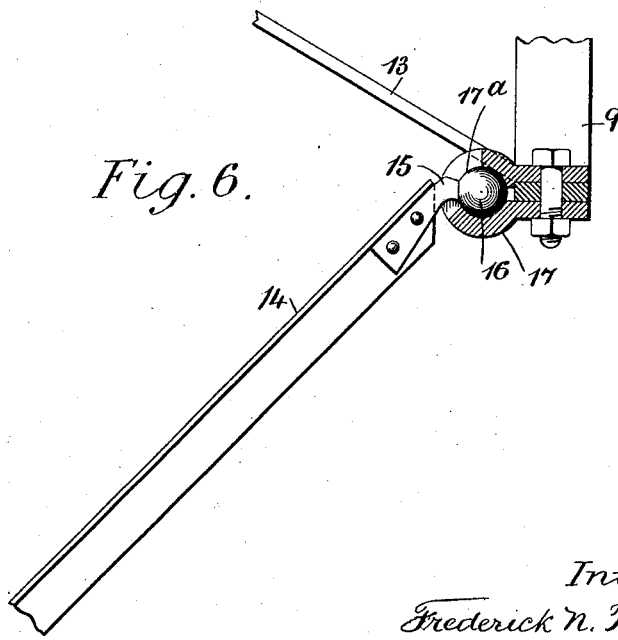

In the accompanying drawing: Figure 1 is a perspective view of a cultivator equipped with my improvement; Fig. 2 is a side elevation of the same in larger size, with the axle in section on the dotted line $x$, $x$, Fig. 3; Fig. 3 is a front view of the cultivator with some parts removed for clearness; Fig. 4 is a side view with some of the parts broken away and others removed showing the colters and their operating mechanism as they appear in action. Fig. 5 is a detached view of the arch-bar and its attached rocker arm, and Fig. 6 illustrates the ball and socket connection of the draft beams with the front draft arch.

Similar reference numerals refer to like parts throughout the separate views.

1, 1, indicates the carrying wheels. 2 the axle upon which the wheels turn, and which is bent or bowed upwardly at a predetermined distance from the wheels, so that its center is considerably higher than its ends connected with the wheels.

3 indicates the forward portion of the frame to which the tongue 4 is bolted and 5 the whiffletrees connected to the tongue. The frame 3 is connected to the central raised portion of the axle 2, preferably by clips 6, and has bolted to it a rearwardly extended portion 3ª, to the extreme end of which the seat 7 is secured, preferably by a bolt 8. Secured to the under surface of the tongue 4, and to the forward end of the frame 3, is a dependent draft arch 9, having its ends bent outward at about right angles on either side, and to which ends at either side of the tongue are bolted one end of the brace rods 10, 10, the other ends of said brace rods being connected to the upright portions of the axle 2, at either side of the machine, preferably by U-shaped spanning clips, 11, 11, of usual character, with clamping nuts 12, 12. Additional brace rods 13, 13, are also preferably employed secured at one end to the under surface of the frame 3, while the other ends are secured to the ends of the dependent draft arch 9 in common with the braces 10 and preferably by the same bolts.

14, 14, indicate two oppositely positioned draft beams, the forward ends of which are provided with a bent neck or projection 15, terminating in rounded heads 16, entering bracket sockets 17, bolted to the dependent draft arch 9. These rounded heads and socket joints permit the draft beams 14 to be swung upward by the operator when desired through the means hereafter described, the weight of the beams and attached parts hereafter described insuring the retention of the rounded heads 16 within the sockets 17 at all times. These sockets 17 are provided with grooves 17ª into which the necks or projections 15 on the draft beams 14 rest, which grooves are gradually spread or widened toward their outer ends thus permitting lateral movement of the necks or projections 15 therein, as shown in Fig. 6. These draft beams 14 about midway of their length are bent at an angle so that in a normal position their forward ends extend from the bar 9 rearward in a downwardly inclined position while their rear ends occupy a substantially horizontal position. About midway of these beams 14, there are bolted to their under surface dependent V-shaped draft brackets 18, 18, terminating in tubular sockets 19, 19.

20, 20, represent four rods, each having an eye at one end for connection with the brackets 18 by bolts 22, and bent over at their other and free ends in the form of hooks 21, 21.

23 indicate four hangers, pivotally connected in pairs at their upper ends to the extreme rear ends of the draft beams 14, preferably by pins or bolts 24. These hangers 23, are bent outwardly below their connection with the draft beams 14 so that their lower ends are spread apart, and each hanger is provided in its lower end with a hole through which is passed a ring or bent-over pivot pin 25 secured to the cross bar 26. Located forwardly of the cross bars 26 and parallel therewith at a predetermined distance are the cross-bars 27, preferably of somewhat larger diameter than the cross-bars 26. These cross-bars 26 and 27 are rigidly secured together by the straps or bars 28, bolted at their respective ends to each cross bar and form frames. The cross bars 27 are each provided on their forward side with eyes or loops 29, through which the hooked ends 21 of the rods 20 are inserted. Spaced apart cultivator blades or colters 30, are connected at their forward ends to the cross heads 27 by suitable means, preferably by bolts 31. It will therefore be seen that each gang of colters are jointedly connected with the draft beams. The colters 30 are semi-circular in a horizontal plane at the ends connected to the cross bars 27 and rearwardly they are twisted into vertical positions and sinuously curved, having downward spurs 32 intermediate their length and at the point of opposite curvature. Upon the front surface of each of the cross bars 27 and central thereof, is secured a lifting link 33, having at its upper or free end an eye or socket.

35, 35, are two treadles, fulcrumed at 36 to brackets 37, extending downward from the rear of the draft beams 14, which brackets are preferably a part of said draft beams, or they may be separate members and secured thereto. The rear ends of these levers or treadles 35, extend between the hangers 23 and are then bent toward each other and at an angle to their forward ends, the extreme rear ends being bent upwardly and provided with a foot rest. The forward portions of these treadles 35 are provided with spaced holes 38. Rods 39 are pivoted at one end to the brackets 37 by the same pivot pins or bolts by which the treadles are fulcrumed and at their other ends to the rear ends of two rocker bars 40, 40. These latter are provided with spaced holes 41 for interchangeable connection with the rods 39 for leverage. These rocker bars 40 are pivotally and adjustably connected to the lifting links 33, by bolts 44.

43, 43, are two rods having each end bent at right angles and one end of these rods 43 is inserted into one of the holes 38 in the treadles 35, at or near the forward end thereof, and the lower or other ends of these rods 43 are inserted into one of the forward holes 41, in the rocker bars 40. These rods are held in such positions in any desired manner.

46 is a centrally disposed arch-bar having its lower ends extended laterally in opposite direction about at right angles to its vertically disposed parts and these right angled portions overlie the respective draft beams 14 and are clamped thereto by the heads 47 provided with a transverse slot on their forward faces into which the ends of the arch-bar are inserted, suitable bolts and nuts being employed to clamp the heads 47 to the draft beams, there being an overturned lip on each head forward of the slot therein to better secure the ends of the arch-bar in said slots. At the top of the arch-bar 46 and centrally thereof on its forward surface is pivoted a rocker arm 51. This rocker arm 51 is provided with spaced holes 54 at each end thereof for adjustment and leverage and for receiving two connecting rods 55, extending between said rocker arm and the respective treadles 35. These rods 55 at their bent ends are preferably provided with a hole to receive a fastening pin but it is obvious that other fastening devices may be employed. The upper bent over ends of the rods 55 are passed through one of the holes at or near the respective ends of the rocker arm 51 and their lower bent over ends are passed through one of the holes 38 at or near the forward ends of the respective treadles 35. If desired, the lower bent over ends of the rods 55 may be connected with the rocker-bars 40 instead of with the treadles 35 as shown in Fig. 1.

56, 56, are two toothed segments secured to and supported upon the frame 3, one at each side thereof, and 57, 57, are two levers fulcrumed to said segments at 58, and which extend toward the seat 7, within easy reach of the driver. These levers 57 carry latch rods 59 engaging with the teeth of the segments 56 to hold the levers in the desired position. The integral forward ends of the levers 57 are bifurcated to receive the sleeves 60 which are provided on their opposite sides with integral pins 61 which enter holes in the bifurcated ends of the levers 57 and in which holes said pins work freely. These sleeves 60 surround and are slidable upon the vertical rods 62, the lower ends of which are secured to the respective ends of the arch-bar 46 in any suitable manner. Coiled around the rods 62, both above and below the sleeves 60, are helical springs 63, having a bearing at one end against said sleeves and at the other ends against collars or nuts 64, secured to the rods 62.

The machine is a straddling-row cultivator and it will be readily seen that the central raised portion of the axle 2 and the arch-bar 46 allow the machine to pass freely over the crop being cultivated without danger of injury to the plants.

The operation of the machine is as follows:—When the colters are set as illustrated in Figs. 1, 2 and 3, of the drawings, and the driver depresses with his foot the end of the right-hand treadle 35, it will cause the forward end of such treadle to move upward and through the means of the rod 43 the forward end of the rocker bar 40 will be drawn upward, which will cause the lifting link 33, attached to the cross bar 27, to lift said bar 27 and thereby raise the forward ends of the colters 30 attached to this bar out of the ground, while at the same time the rear ends of these colters will be lowered, thus this gang of colters will then only have their rear ends actually in the ground. Depressing the right-hand foot treadle 35 will through the means of the connecting rods 55 and the rocker arm 51 on the arch-bar 46 force down the forward end of the rocker bar 40 on the opposite side of the machine and thereby cause a reverse action with the gang of colters at that side of the machine; in other words, the forward ends of the colters will be forced into the ground, while their rear ends will be lifted out of the ground. This is illustrated in Fig. 4 of the drawing. The right hand gang of colters having their rear ends curved toward the left, and being elevated at the forward end, and the left hand gang of colters having their forward ends curved toward the left, and being elevated at the rear end, will, while the machine is being drawn forward, cause both gangs of colters, due to the resistance of the earth being worked, to have a tendency to travel to the right.

It is obvious that when the lever end of the treadle 35 at the left hand side of the machine is depressed by the foot of the driver, the action will be the reverse, that is the forward ends of the colters on that side of the machine will be raised and their rear ends forced deeper into the ground while the forward ends of the right hand gang of colters will be lowered and their rear ends raised and the forward ends of this gang being curved toward the right, while the rear ends of the left hand gang of colters are likewise curved to the right, the ground will be cut in the same direction by both gangs, and they will have a tendency to travel toward the left.

The arch-bar 46 has sufficient resiliency or spring to permit of the gangs traveling slightly either to the right or to the left without undue strain or danger of injury to the parts.

The peculiar shape of the colters cause them while the machine is in operation to thoroughly pulverize and mellow the surface soil to the required depth without danger of disturbing the roots of the crop being cultivated, and the pulverized earth acts as an absorber of moisture in the atmosphere and a conserver of moisture in the ground.

By means of the levers 57, the driver can lift both gangs of colters entirely clear of the ground when desired for turning the machine or when moving from one field to another, and in cases where the soil is soft so that the carrying wheels sink into the ground, these levers can be operated by the driver to adjust the gangs of colters to the desired relative position so that they will not work at too great a depth in the ground.

When the condition of the soil requires it, more weight, or a greater pressure may be given upon the colters by forcing them down through means of the levers 57 and rods 62. It will thus be readily understood that by these means both gangs of colters may be simultaneously lifted entirely clear of the ground or adjusted so as to act at a greater or less depth in the ground according to the condition of the soil, and that they may be retained in their adjusted positions by means of the latch rods 59.

I claim as my invention:

1. A straddle row cultivator having two spaced apart draft beams, a gang of sinuous colters jointedly connected with the rear of each draft beam, and means connected with both gangs of colters whereby the forward ends of one gang of colters may be raised and their rear ends lowered, while at the same time the forward ends of the other gang of colters are forced downward and their rear ends raised.

2. In a straddle row cultivator, the combination with the carrying wheels, axle, frame and draft pole or tongue thereof, of two spaced apart draft beams, a draft arch to which the forward ends of the draft beams are jointedly connected, a gang of sinuous colters jointedly connected with the rear end of each draft beam, and means connected with both gang of colters whereby the forward ends of one gang of colters may be raised and their rear ends lowered, while at the same time the forward ends of the other gang of colters are forced downward and their rear ends raised.

3. In a straddle row cultivator, the combination with the carrying wheels, axle, frame and tongue, of a draft arch, two grooved sockets secured to said draft arch, one at a predetermined distance from each end thereof, two spaced apart draft beams, a bent neck or projection secured at one end to the forward ends of the respective draft beams and terminating in a rounded head adapted to fit within said sockets while the necks rest within the grooves in said sockets, a gang of sinuous colters jointedly connected with the rear end of each draft beam, and means connected with both gangs of colters whereby the forward ends of one gang of colters may be raised and their rear ends lowered, while at the same time the forward ends of the other gang of colters are forced downward and their rear ends raised.

4. In a straddle-row cultivator, the combination with the carrying wheels, axle, frame and tongue, of a draft arch, two spaced apart draft beams jointedly connected at their forward ends to said draft arch, a gang of sinuous colters jointedly connected with the rear end of each draft beam, an arch-bar having its ends secure to the said draft beams, a rocker arm pivotally connected to said arch-bar, connecting rods each having one end connected to the respective ends of said rocker arm and their other ends jointedly connected with the respective gangs of colters and means for operating said parts whereby the angular relation of the colters with the soil may be adjusted.

5. In a straddle-row cultivator, the combination with the carrying wheels, axle frame and tongue, of a draft arch, two spaced apart draft beams jointedly connected at their forward ends to said draft arch, two spaced apart gangs of sinuous colters, a cross-bar to which the forward ends of the colters are secured, a cross-bar to the rear of each of said cross-bars and rigidly secured thereto, jointed connection between each of said cross-bars and said draft beams, rocker bars, a lifting link secured to each of said forward cross-bars at one end and pivotally connected at its other end with one of said rocker bars, a bracket dependent from each of said draft beams at the rear end thereof, a foot treadle fulcrumed at the lower end of each of said brackets, rods pivotally connected with said treadles and said rocker-bars, an arch-bar having its respective ends secured to said draft beams, a rocker arm pivotally connected to said arch-bar, connecting rods each having one end pivotally connected to one end of said rocker arm and their other ends pivotally connected to said treadles at or near the forward ends thereof, whereby when the treadles are operated, the angular relation of the colters with the soil is changed.

6. In a straddle-row cultivator, the combination with the carrying wheels, axle, frame and tongue, of a draft arch, two spaced apart draft beams jointedly connected at their forward ends to said draft arch, two spaced apart gangs of sinuous colters, cross-bars to which the forward ends of each gang of colters are respectively secured, a cross-bar to the rear of each said cross-bars and rigidly secured thereto, a draft bracket dependent from each of said draft beams at or about the center thereof, connecting rods between each of said draft brackets and said forward cross bars pivotally connected at each end, hangers pivotally connected at one end to the rear end of each of said draft beams and at their other ends pivotally connected to said rear cross-bars, rocker bars, a lifting link secured to each of said forward cross bars at one end and pivotally connected at its other end with one of said rocker bars, a bracket dependent from the rear end of each draft beam, a foot treadle fulcrumed at the lower end of each of said brackets, rods pivotally connected with said treadles and said rocker bars, an arch-bar having its respective ends secured to said draft beams, a rocker arm pivotally connected to said arch-bar, connecting rods each having one end pivotally connected to one end of said rocker arm and their other ends pivotally connected to said treadles at or near the forward end thereof, whereby when the treadles are operated the angular relation of the colters with the soil is changed.

Signed by me this 25th day of May, 1911.

FREDERICK N. TAFF.

Witnesses:
GEO. T. PINCKNEY,
E. ZACHARIASEN.

---

Copies of this patent may be obtained for five cents each, by addressing the "Commissioner of Patents, Washington, D. C."